US011858804B2

(12) United States Patent
Paterlini

(10) Patent No.: US 11,858,804 B2
(45) Date of Patent: Jan. 2, 2024

(54) METHOD AND SYSTEM FOR EMPTYING A DRUM CONTAINING A VISCOUS LIQUID

(71) Applicant: C.S.F. INOX S.P.A.

(72) Inventor: Rolando Paterlini, Montecchio Emilia (IT)

(73) Assignee: C.S.F. INOX S.P.A., Montecchio Emilia (IT)

( * ) Notice: Subject to any disclaimer, the term of this patent is extended or adjusted under 35 U.S.C. 154(b) by 414 days.

(21) Appl. No.: 17/311,163

(22) PCT Filed: Nov. 26, 2020

(86) PCT No.: PCT/IB2020/061178

§ 371 (c)(1),
(2) Date: Jun. 4, 2021

(87) PCT Pub. No.: WO2021/130574

PCT Pub. Date: Jul. 1, 2021

(65) Prior Publication Data

US 2022/0298001 A1 Sep. 22, 2022

(30) Foreign Application Priority Data

Dec. 23, 2019 (IT) ........................ 102019000025237

(51) Int. Cl.
*B67D 7/64* (2010.01)
*F04B 15/02* (2006.01)

(52) U.S. Cl.
CPC .............. *B67D 7/645* (2013.01); *F04B 15/02* (2013.01)

(58) Field of Classification Search
CPC ................................ B67D 7/645; F04B 15/02
See application file for complete search history.

(56) References Cited

U.S. PATENT DOCUMENTS 3,601,285 A * 8/1971 Leger ........................ B67D 7/62 222/66
4,635,820 A * 1/1987 Marshall .................. B67D 7/80 222/405

(Continued)

FOREIGN PATENT DOCUMENTS

DE 202013102871 7/2013
DE 102013020932 A1 7/2014

(Continued)

OTHER PUBLICATIONS

International Search Report for PCT/IB2020/061178, dated Feb. 24, 2021, 12 pages.

*Primary Examiner* — Bob Zadeh
(74) *Attorney, Agent, or Firm* — Pearne & Gordon LLP; Bryan M. Gallo

(57) ABSTRACT

A system for emptying a container containing a fluid is provided. The system includes a pumping unit with at least one pump, a scraping plate arranged at a first end of the pump, and a motor arranged at a second end of the pump. A pneumatic cylinder is operatively active on the pumping unit for moving it inside a container. A supply circuit supplies air to the pumping unit below the scraping plate. A control unit utilizes first and second sensors and is configured at least to activate the pump via the motor, stop the descent of the pumping unit and deactivate the pump, enable or interrupt communication between the pumping unit and the air supply circuit, and force the cylinder to exert a first force on the pumping unit after deactivating the pump and exert a second force on the pumping unit in response to the first sensor.

9 Claims, 2 Drawing Sheets

(56) References Cited

U.S. PATENT DOCUMENTS

| | | | | | |
|---|---|---|---|---|---|
| 4,679,989 | A * | 7/1987 | Harriman | F04B 49/12 | |
| | | | | 417/489 | |
| 6,082,888 | A * | 7/2000 | Sakayori | B05C 11/10 | |
| | | | | 417/42 | |
| 6,457,356 | B1 * | 10/2002 | Meloche | B67D 7/0227 | |
| | | | | 73/321 | |
| 2010/0129252 | A1 * | 5/2010 | Takase | F04C 2/1073 | |
| | | | | 418/48 | |
| 2022/0298001 | A1 * | 9/2022 | Paterlini | F04B 15/02 | |

FOREIGN PATENT DOCUMENTS

| | | | | |
|---|---|---|---|---|
| DE | 102014114374 | B3 | 3/2016 | |
| DE | 102016125207 | A1 * | 6/2018 | B05C 11/10 |
| GB | 2314127 | A | 12/1997 | |
| JP | 2005133676 | A * | 5/2005 | |
| JP | 2005133676 | A | 5/2005 | |
| JP | 2006322359 | A * | 11/2006 | |

* cited by examiner

METHOD AND SYSTEM FOR EMPTYING A DRUM CONTAINING A VISCOUS LIQUID

TECHNICAL FIELD

The present invention relates to a method and system for emptying a container, e.g. a drum, containing a fluid product.

The present invention can mainly be applied in the sector of the food industry, but it can also be used in the chemical and pharmaceutical sectors.

BACKGROUND ART

In the food sector there are many processes for transforming raw materials into products for consumption. Fluid semi-processed products are moved various times into relevant containers (e.g. preparation containers, mixers, drums, cases) and systems are usually used for emptying such containers.

Typically, such systems comprise a pneumatic cylinder that forces a pumping unit into the container, appropriately arranged below it. Such pumping unit comprises at least one pipe terminating at one end with a scraping plate, which first engages the container, and connected at the other end to a pump. The scraping plate has a central hole communicating with the pipe and its descent forces the fluid into it. Due to the action of the pump, the fluid is sucked through the pipe and directed towards a device for distribution or towards another container. After finishing the emptying operation, the cylinder lifts the pumping unit, forcing the scraping plate out of the container.

For information purposes, the pumps used in such systems vary according to the product contained in the containers to be emptied. For example, they are of the alternative volumetric, eccentric screw, membrane, double screw type.

In this context, the existing solutions imply a series of disadvantages. Above all, the presence of an operator to manually control the movement of the pumping unit and who guarantees the correct performance of the operations is necessary. This extends the times for performing the set of operations and does not guarantee the optimal emptying of the containers.

Furthermore, solutions of the known type activate the pumping unit in the emptying step through the pneumatic cylinder. This generates overturning moments, especially in the latter part of the stroke of the pumping unit within the container, which are dangerous for the operator. Furthermore, frequent maintenance of the movement means is necessary. Again, during the upwards return of the pumping unit, it is a critical moment when the scraping plate disengages the container. In fact, the exit of the plate implies the undesired lifting of the container. To face this problem, some known solutions envisage the use of systems for locking the container, thus increasing the structural complexity and costs.

Disclosure of the Invention

In this context, the technical task underpinning the present invention is to provide a method and a system for emptying a container, e.g. a drum, containing a fluid product, which obviate the drawbacks of the prior art cited above.

In particular, the object of the present invention is a method and a system for emptying a container, e.g. a drum, containing a fluid product, which reduce the performance times of the operations and ensure the optimal emptying of the container.

Another object of the present invention is to make available a method and a system for emptying a container, e.g. a drum, containing a fluid product, which increases the safety with respect to known solutions.

The defined technical task and the specified objects are substantially reached by a system for emptying a container, e.g. a drum, containing a fluid product, the system comprising:

a pumping unit comprising:

a pump;

a scraping plate arranged at a first end of the pump and having a through hole at it;

a motor arranged at a second end of the pump;

a pneumatic cylinder operatively active on the pumping unit for moving it inside a container;

a first and a second sensor;

a supply circuit for supplying air to the pumping unit, the air supply circuit being configured to supply air below the scraping plate;

a control unit configured at least to:

activate the pump by means of the motor, in response to the detection by the first sensor of a passage of the pumping unit at a first level of the container;

stop the descent of the pumping unit and deactivate the pump in response to the detection by the second sensor of a passage of the pumping unit at a second level of the container. The second level is lower than the first level;

enable the communication between the pumping unit and the air supply circuit after having deactivated the pump;

interrupt the communication between the pumping unit and the air supply circuit in response to the detection by the first sensor of a further passage of the pumping unit at the first level of the container.

The pneumatic cylinder is operatively active on the pumping unit for exercising at least a first force and a second force of a greater size than the first.

The control unit is further configured to:

force the cylinder to exert the first force on the pumping unit after having deactivated the pump;

force the cylinder to exert the second force on the pumping unit in response to the detection by the first sensor of a further passage of the pumping unit at the first level of the container.

According to one embodiment, the first and the second sensor are arranged on the pneumatic cylinder.

In accordance with one embodiment, the first and the second sensor are magnetic.

According to one embodiment, the control unit is further configured to make the pumping unit stop at the second level for a predefined period of time.

According to one embodiment, the system further comprises a means for positioning the container below the pumping unit.

For example, the means for positioning the container comprises at least one adjustable guide element.

According to one embodiment, the system further comprises a plurality of wheels such as to be able to be moved on a resting plane.

The defined technical task and the specified objects are substantially reached by a method for emptying a container, e.g. a drum, containing a fluid product, comprising the steps of:

arranging the container in a predetermined position below a pumping unit. Such pumping unit comprises at least a pump and a scraping plate;

moving the pumping unit close to a mouth of the container;

detecting a passage of the pumping unit at a first level of the container;

upon detection of the passage of the pumping unit at the first level, activating the pump;

making the pumping unit descend towards a bottom of the container so that the pump sucks the product inside the container during the descent of the pumping unit;

detecting a passage of the pumping unit at a second level of the container, lower than the first level;

upon detection of the passage of the pumping unit at the second level, stopping the descent of the pumping unit;

deactivating the pump;

dispensing air coming from an air supply circuit to the pumping unit inside the container;

making the pumping unit return upwards towards the mouth of the container through the combined action of a pneumatic cylinder which is operatively active on the pumping unit and of dispensed air;

detecting a further passage of the pumping unit at the first level;

upon detection of the further passage of the pumping unit at the first level, interrupting the dispensing of air;

extracting the pumping unit from the container through the action of the pneumatic cylinder.

According to one embodiment, the method further comprises a step of making the pumping unit, once stationary, stop at the second level for a predefined period of time so as to complete the emptying of the container.

BRIEF DESCRIPTION OF DRAWINGS

Further characteristics and advantages of the present invention will become more apparent from the approximate and thus non-limiting description of a preferred, but not exclusive, embodiment of a method and a system for emptying a container, e.g. a drum, containing a fluid product, as illustrated in the accompanying drawings, in which.

DETAILED DESCRIPTION OF PREFERRED EMBODIMENTS OF THE INVENTION

Figure 1:
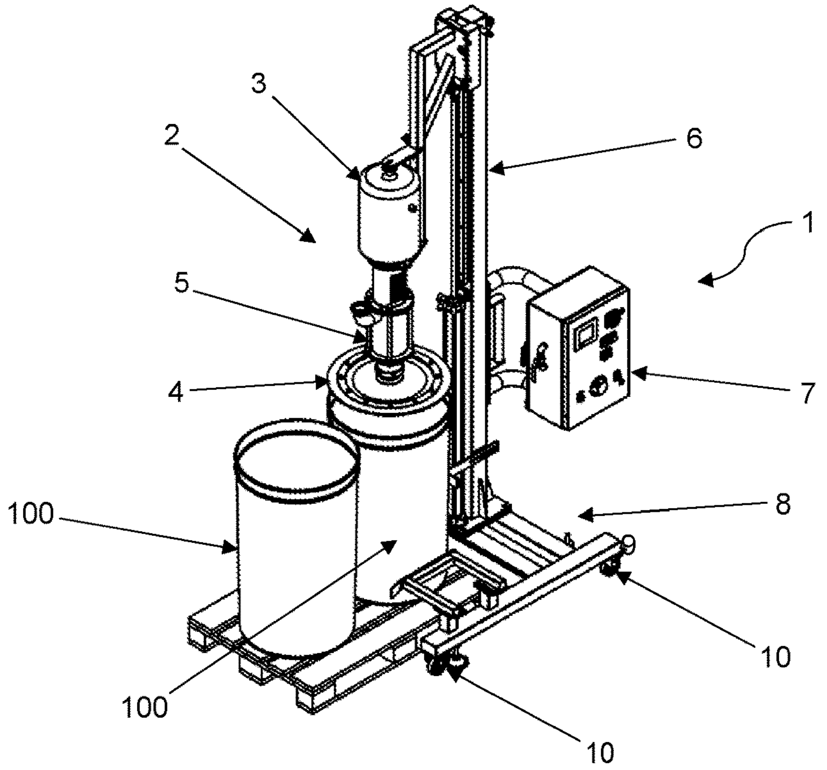
FIG. 1 illustrates a perspective view of a system for emptying a container, e.g. a drum, containing a fluid product, according to the present invention.
Figure 2:
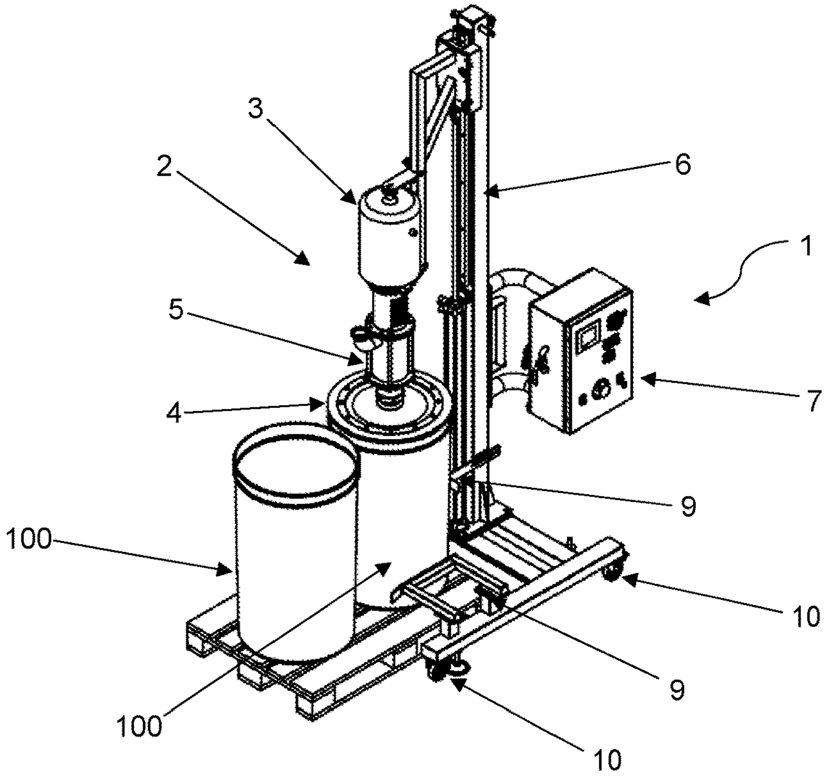
FIG. 2 illustrates the system of FIG. 1 in a configuration in which the scraping plate is at the first level of the container.
Figure 3:
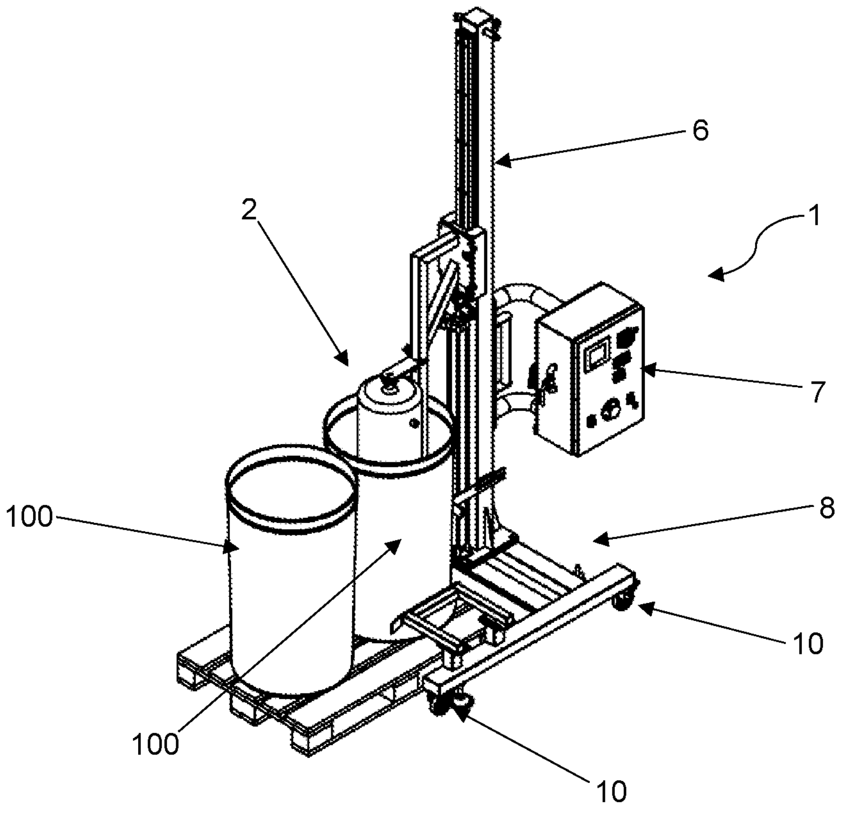
FIG. 3 illustrates the system of FIG. 1 in a configuration in which the scraping plate is at the second level of the container.

With reference to the figures, number 1 indicates a system for emptying a container, e.g. a drum, containing a fluid product.

The system 1 comprises a pumping unit 2. Such pumping unit 2 comprises:

- a pump 5;
- a scraping plate 4 arranged at a first end of the pump 5 and having a through hole at it;
- a motor 3 arranged at a second end of the pump 5.

Preferably, the motor 3 is of the pneumatic activation type. The pumping unit 2 is moved vertically inside the container 100 by means of a pneumatic cylinder 6. Preferably, the pneumatic cylinder 6 is operatively active on the pumping unit 2 for providing at least a first force and a second force of a greater magnitude than the first.

The system 1 further comprises a first and a second sensor suitable to detect the presence of the pumping unit 2.

There is also a supply circuit for supplying air to the pumping unit 2. Preferably, the air supply circuit communicates with the scraping plate 4 so that it dispenses air below it.

The system 1 further comprises a control unit 7 configured at least to:

- activate the pump 5 in response to the detection by the first sensor of a passage of the pumping unit 2 at a first level of the container 100;
- stop the descent of the pumping unit 2 and deactivate the pump 5 in response to the detection by the second sensor of a passage of the pumping unit 2 at a second level of the container 100;
- enable the communication between the pumping unit 2 and the air supply circuit after having deactivated the pump 5;
- interrupt the communication between the pumping unit 2 and the air supply circuit in response to the detection by the first sensor of a further passage of the pumping unit 2 at the first level of the container 100;

The second level is lower than the first level.

Preferably, the control unit 7 is further configured to make the pumping unit 2 stop at the second level for a predefined period of time so as to complete the emptying of the container 100. This happens after stopping the descent of the pumping unit 2 and before deactivating the pump 5.

Preferably, the control unit 7 is further configured to:

- force the cylinder 6 to exert the first force on the pumping unit 2 after having deactivated the pump 5;
- force the cylinder 6 to exert the second force on the pumping unit 2 in response to the detection by the first sensor of a further passage of the pumping unit 2 at the first level of the container 100.

In the embodiment described and illustrated herein, the sensors are arranged on the pneumatic cylinder 6. According to the height of the container 100, it is possible to determine a first position and a second position assumed by the cylinder 6 when the pumping unit 2 passes at the first level and the second level, respectively. By positioning the first and the second sensor in this way, it is possible to detect when the pumping unit 2 is at the first and the second level. In the eventuality of a format change for the container 100, the position of the sensors is easily and quickly adaptable.

Preferably, the sensors are of the magnetic type.

It is to be noted that the connection between the pneumatic cylinder 6 and the pumping unit 2 is of the rigid type, therefore the motion of the pumping unit 2 is of the rigid type. Therefore, knowing the position assumed by any point of the pumping unit 2 with respect to the pneumatic cylinder 6, the position of all the points of the pumping unit 2 is also known. Therefore, it can be envisaged without any significant modification to the system 1 to implement the sensors described above in a component of the pumping unit 2. In an alternative embodiment, the sensors are arranged on the scraping plate 4. For example, such sensors are proximity sensors, of the induction or ultrasonic type. Preferably, the system 1 further comprises a positioning means 8 for positioning the container below the pumping unit 2. In the embodiment described and illustrated herein, such positioning means 8 comprises at least one adjustable guide element 9. Preferably, there are at least three guide elements 9 suitable for contacting the container 100 in three distinct points.

In an alternative embodiment, the positioning means 8 comprises a conveyor belt with intermittent operation.

Preferably, the system 1 further comprises a plurality of wheels 10. Thus the system 1 can be moved on a resting plane.

The method for emptying a container, e.g. a drum, containing a fluid product, according to the present invention, is described below.

Above all, the container 100 is arranged below a pumping unit 2 in a predefined position. Preferably, the arrangement in a predefined position takes place by means of the adjustable guide element 9.

The pumping unit 2 is moved close to a mouth of the container 100. Then, the passage of the pumping unit 2 at the first level of the container 100 is preferably detected by means of the first sensor. For example, such first level may be the mouth or a level of the container 100 below the mouth. For example, such level may identify the level of the product contained inside.

Passage of the pumping unit 2 at the first level means that the passage of at least one of the elements comprising the pumping unit 2 is detected.

Preferably, the passage of the scraping plate 4 at the first level of the container 100 is detected.

Upon detection of the passage of the pumping unit 2 at the first level, the pump 5 is activated.

The pumping unit 2 descends towards a bottom of the container 100 so that the pump 5 sucks the product inside the container 100 during the descent of the pumping unit 2. Preferably, the descent of the pumping unit 2 is activated by the sole weight of the pumping unit 2 without the intervention of external forces thereto.

During the descent, the passage of the scraping plate 2 at the second level of the container 100 is detected. For example, the second level may be the bottom of the container 100 or a level of the container 100 above the bottom. In any case, as already mentioned, the second level is lower than the first level.

The detection preferably takes place through the second sensor.

Upon detection of the passage of the pumping unit 2 at the second level, the descent of the pumping unit 2 stops and the pump 5 is deactivated. Passage of the pumping unit 2 at the second level means that the passage of at least one of the elements comprising the pumping unit 2 is detected.

Preferably, the passage of the scraping plate 4 at the second level of the container 100 is detected.

The method further comprises a step of dispensing air inside the container 100 coming from the air supply circuit to the pumping unit 2.

Then, the pumping unit 2 is made to return upwards towards the mouth through the combined action of a pneumatic cylinder 6 which is operatively active on the pumping unit 2 for providing the first force and of dispensed air. According to one embodiment, the first force exerted by the pneumatic cylinder 6 in this step is substantially equal and opposite to the weight force of the pumping unit 2.

During the upwards return, a further passage of the pumping unit 2 at the first level is detected, preferably by means of the first sensor.

Upon detection of the further passage of the pumping unit 2 at the first level, the dispensing of air is interrupted.

Finally, the pumping unit 2 is extracted from the container 100 through the action of the pneumatic cylinder 6. Preferably, in this step, the pneumatic cylinder 6 exerts on the pumping unit 2 the second force of a greater magnitude with respect to the first force. Preferably, the pumping unit 2 is made to stop at the second level for a predefined period of time so as to complete the emptying of the container 100. This step takes place after stopping the descent of the pumping unit 2 and before deactivating the pump 5.

The characteristics and the advantages of the method and system for emptying a container, e.g. a drum, containing a fluid product, according to the present invention, prove to be clearly indicated in the description provided, as do the advantages.

In particular, the use of sensors for detecting the passage of the pumping unit in determined positions makes it possible to automate, at least in part, the drum emptying operations, reducing the times and increasing the reliability. In fact, it is no longer necessary to have to appoint an operator to establish the end of one operation and the beginning of the next.

Furthermore, the descent of the pumping unit only takes place due to the weight force of the pumping unit. The pneumatic cylinder does not push downwards, thus preventing the formation of overturning moments during emptying, which are dangerous to any operators who may be in the vicinity. Furthermore, in this way, bases are not necessary to contrast the thrust of the cylinder in the downwards direction, which would make the machine less hygienic and easy to clean, as well as making the step of positioning drums below the pumping unit more difficult.

Furthermore, the change in magnitude of the thrust of the cylinder to the pumping unit when the pumping unit is to be extracted from the container enables the lifting of the container itself to be prevented, as happens in some known solutions. Furthermore, it is no longer necessary to envisage the use of means for locking the container to solve the problem of the container being lifted, therefore the system is more streamlined.

The invention claimed is:

1. A system (1) for emptying a container (100), containing a fluid product, the system (1) comprising:

a pumping unit (2), comprising:
- a pump (5);
- a scraping plate (4) arranged at a first end of the pump (5) and having a through hole at it;
- a motor (3) arranged at a second end of the pump (5).

a pneumatic cylinder (6) operatively active on the pumping unit (2) for moving it inside the container (100);

a first and a second sensor;

a supply circuit for supplying air to the pumping unit (2), said air supply circuit being configured to supply air below the scraping plate (4);

a control unit (7) configured at least to:
- activate the pump (5) by means of the motor (3) in response to the detection by the first sensor of a passage of the pumping unit (2) at a first level of the container (100);
- stop the descent of the pumping unit (2) and deactivate the pump (5) in response to the detection by the second sensor of a passage of the pumping unit (2) at a second level of the container (100), said second level being lower than said first level;
- enable the communication between the pumping unit (2) and the air supply circuit after deactivating the pump (5);
- interrupt the communication between the pumping unit (2) and the air supply circuit in response to the detection by the first sensor of a further passage of the pumping unit (2) at the first level of the container (100), wherein the pneumatic cylinder (6) is operatively active on the pumping unit (2) for exerting a first force and a second force of a greater magnitude than the first force, said control unit (7) being further configured to:

force the cylinder (6) to exert the first force on the pumping unit (2) after deactivating the pump (5);

force the cylinder (6) to exert the second force on the pumping unit (2) in response to the detection by the first sensor of the further passage of the pumping unit (2) at the first level of the container (100).

2. The system (1) according to claim 1, wherein said first and second sensor are arranged on the pneumatic cylinder (6).

3. The system (1) according to claim 1, wherein said first and second sensor are magnetic.

4. The system (1) according to claim 1, wherein the control unit (7) is further configured to make the pumping unit (2) stop at the second level for a predefined period of time.

5. The system (1) according to claim 1, further comprising a positioning means (8) for positioning the container (100) below the pumping unit (2).

6. The system (1) according to claim 5, wherein said positioning means (8) for positioning the container (100) comprises at least one adjustable guide element (9).

7. The system (1) according to claim 1, further comprising a plurality of wheels (10), said system (1) being movable on a support plane.

8. A method for emptying a container (100), containing a fluid product, by means of a system (1) according to claim 1, the method comprising the following steps:

arranging the container (100) in a predetermined position below the pumping unit (2) comprising at least the pump (5) and the scraping plate (4);

moving the pumping unit (2) close to a mouth of the container (100);

detecting the passage of the pumping unit (2) at the first level of the container (100);

upon detection of the passage of the pumping unit (2) at the first level, activating the pump (5);

making the pumping unit (2) descend towards a bottom of the container (100) so that the pump (5) sucks the product inside the container (100) during the descent of said pumping unit (2);

detecting the passage of the pumping unit (2) at the second level of the container (100), said second level being lower than said first level;

upon detection of the passage of the pumping unit (2) at the second level, stopping the descent of the pumping unit (2);

deactivating the pump (5);

dispensing air coming from the air supply circuit to the pumping unit (2) inside the container (100);

making the pumping unit (2) return upwards towards the mouth of the container (100) through the combined action of the pneumatic cylinder (6) which is operatively active on the pumping unit (2) and of dispensed air;

detecting the further passage of the pumping unit (2) at said first level;

upon detection of the further passage of the pumping unit (2) at said first level, interrupting the dispensing of air;

extracting the pumping unit (2) from the container (100) through the action of the pneumatic cylinder (6).

9. The method according to claim 8, further comprising a step of making the pumping unit (2), once stationary, stop at the second level for a predefined period of time so as to complete the emptying of the container (100).

* * * * *